United States Patent Office

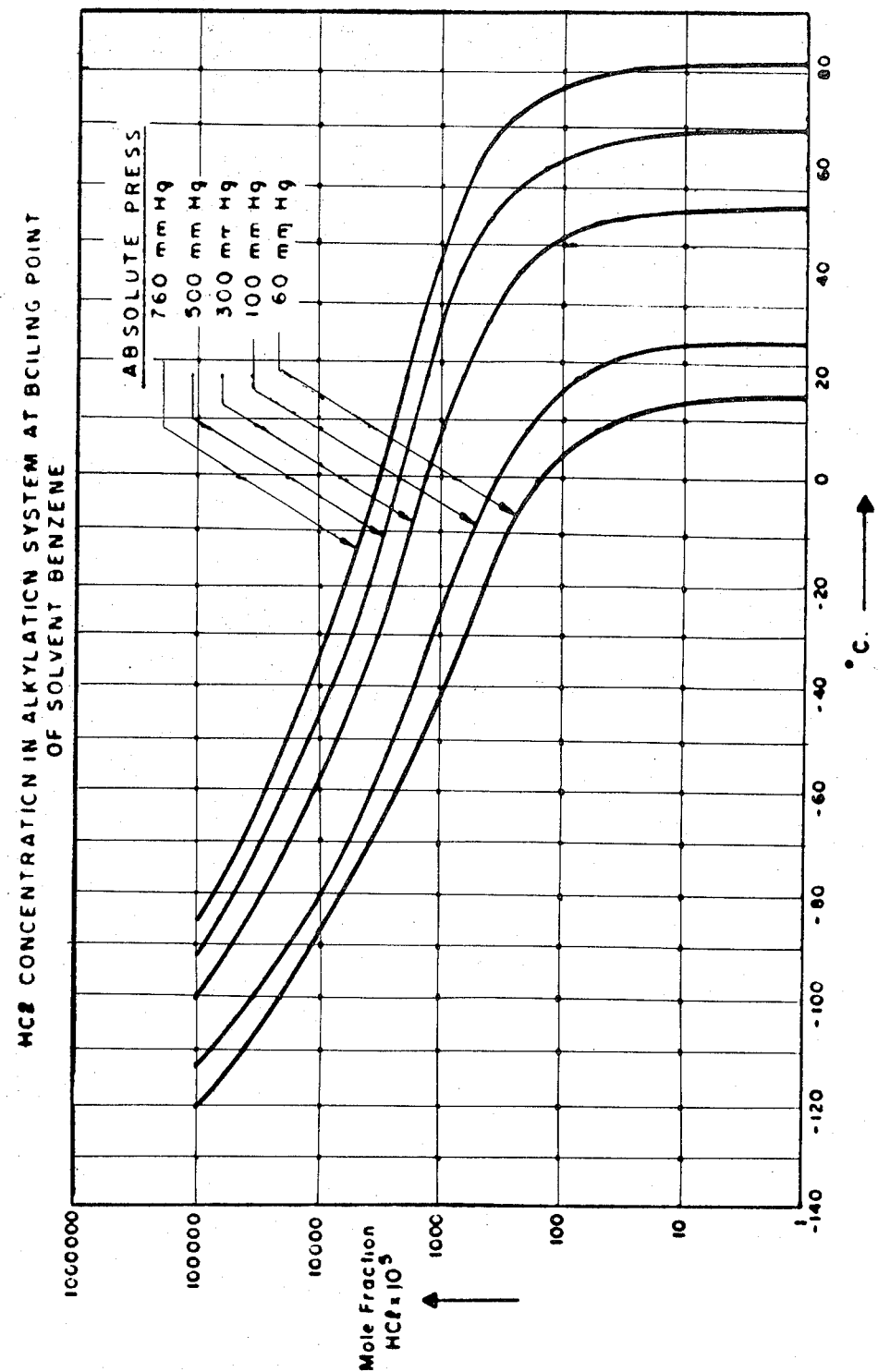

3,739,039
Patented June 12, 1973

3,739,039
SELECTIVE TERTIARY ALKYLATION OF
AROMATIC HYDROCARBONS
Jesse K. Boggs, Houston, Tex., assignor to Esso
Research and Engineering Company
Filed Dec. 28, 1970, Ser. No. 101,921
Int. Cl. C07c 3/00
U.S. Cl. 260—671 R    24 Claims

ABSTRACT OF THE DISCLOSURE

Aromatic hydrocarbons are selectively alkylated in high yields with $C_7$ to $C_{44}$ tertiary alkyl halides, without the formation of substantial quantities of secondary alkyl aromatics, by carrying out the reaction in the presence of a non-volatile Friedel Crafts catalyst, a boiling liquid, and substantially reduced pressures. A sweep gas such as air or an inert gas may be employed with more active Friedel Crafts catalysts such as aluminum chloride. Preferably, the reaction is carried out under a pressure no greater than 150 mm. Hg absolute, and a temperature of 0° to 30° C. The concentration of hydrogen halides in the reaction mass is maintained below 0.02 mol fraction when using less active Friedel Crafts catalysts such as ferric chloride and below 0.005 when using more active catalysts such as aluminum chloride.

BACKGROUND OF THE INVENTION (1) Field of the invention

This invention relates to the alkylation of aromatic hydrocarbons to produce a product wherein a tertiary alkyl group is attached to the hydrocarbon nucleus. The reaction is carried out in the presence of a Friedel Crafts catalyst, in the liquid phase, utilizing a tertiary alkyl halide containing 7 or more carbon atoms. The alkylated aromatic hydrocarbons have utility as chemicals, chemical intermediates, plasticizers, process oils, and synthetic lubricants.

(2) Description of the prior art

The alkylation of aromatic hydrocarbons with alkyl chlorides is well established in the art. However, it has nowhere been recognized that the selective alkylation of aromatic hydrocarbons to produce predominantly tertiary alkyl-aromatic hydrocarbon products can be accomplished in high yields only by suitably maintaining the concentration of hydrogen halide in the reaction mass below a suitable upper limit.

Aromatic hydrocarbons have been alkylated with tertiary alkyl chlorides of 4 and 5 carbon atoms, according to the Sparks et al. patent (U.S. 2,240,583), by a technique utilizing extremely low temperatures which are maintained by use of an autorefrigerant such as methane, ethane or propane. Sparks et al. utilize the control of pressure (suitably involving the use of reduced pressure) as a way of controlling the temperature, by adjusting the boiling point of the autorefrigerant which is employed. Sparks et al. are interested in reacting secondary alkyl halides as well as tertiary alkyl halides, and do not face the problem of avoiding isomerization of the tertiary alkyl halide so as to result in the production of substantial quantities of a secondary alkyl aromatic hydrocarbon. There is no recognition by Sparks et al. that the hydrogen halide concentration in the reaction mass would have any effect on the selectivity of the reaction.

The Hakala patent, U.S. 2,886,609, mentions the control of HCl concentration in the various stages of an olefin alkylation reaction. However, Hakala is not dealing with the preferential tertiary alkylation reaction but rather with the introduction of tetrapropylene onto a benzene ring. Further, Hakala increases the amount of HCl in the benzene alkylation zone over that which is present in the propylene polymerization zone, a teaching which is directly contrary to that of the present invention. It is also noted that Hakala utilizes elevated pressures. The present invention employs tertiary alkyl halides instead of the tertiary olefins used by Hakala as a source of tertiary alkyl groups.

Inatome et al. (JACS 74, 292) found t-amyl chloride (a $C_5$ tertiary alkyl chloride) to be alkylated onto benzene more selectively with an aluminum chloride complex ($AlCl_3 \cdot CH_3NO_2$) and $FeCl_3$ than with $AlCl_3$ alone, but yields were low (18% and 60%, respectively). Schmerling and West (JACS 76, 1917) alkylated benzene at 760 mm. Hg with $C_5$ and $C_6$ tertiary alkyl halides with several catalysts and found poor selectivity with $AlCl_3$ and $ZrCl_4$ but good selectivity with $AlCl_3 \cdot CH_3NO_2$, $FeCl_3$ and $BF_3 \cdot CH_3NO_2$. However, yields were relatively poor when selectivity was high, and vice versa. For example, using $AlCl_3$ as a catalyst, the $C_5$ alkylation produced a 15% selectivity and 43% yield while the $C_6$ alkylation produced only a 10% selectivity and 62% yield. Using $FeCl_3$ as a catalyst for $C_6$ alkylation, a 100% selectivity was obtained but at only 71% conversion. Using $ZrCl_4$ as a catalyst, 85% selectivity was obtained in $C_5$ alkylation but only 15% selectivity for $C_6$ alkylation, illustrating the tendency for isomerization to increase as the number of carbon atoms in the t-alkyl halide increases. The present invention allows selective tertiary alkylation to be accomplished even though the alkylating halide contains 7 or more carbon atoms. By using the present invention, it has been found that in the $C_7$ to $C_{21}$ range, alkylation can be carried out with yields averaging about 91% with selectivities averaging about 92%.

DRAWINGS

The sole figure is a graph of HCl concentration in the alkylation system as a function of temperature and pressure.

DESCRIPTION OF THE INVENTION

It has long been known that a tertiary butyl substituted aromatic hydrocarbon may be used under conditions of exposure to high temperatures and oxidation-promoting conditions, while a primary or secondary butyl substituted aromatic hydrocarbon would be particularly vulnerable to oxidative and thermal decomposition. The explanation arises from the existence of a benzylic hydrogen (a hydrogen atom attached to a carbon alpha to the aromatic ring) on the primary and secondary butyl substituents, which is not present in the tertiary butyl group. In other secondary alkyl benzenes, this benzylic hydrogen is also reactive and susceptible to attack under chemical exposure or extreme thermal or oxidative conditions. Chlorine in sulfuryl chloride, catalyzed by peroxides, easily reacts replacing the benzylic hydrogen. This illustrates the chemical instability of the benzylic hydrogen.

A tertiary alkyl substituent, by contrast, does not possess a benzylic hydrogen and is therefore much more stable. While it has been known in the past to alkylate aromatic hydrocarbons with tertiary butyl chloride or tertiary amyl chloride, because of the structure of these materials the tendency to isomerize into secondary alkyl chlorides is much less pronounced than those having 7 or more carbon atoms which are successfully alkylated by the present invention. In fact, the t-butyl group is practically immune to isomerization.

There have been many attempts in the past to alkylate an aromatic nucleus selectively with a tertiary olefin having 5 or 6 or more carbon atoms.

The direct alkylation of aromatic nuclei with tri-substituted ethylenes has been attempted with fairly good selectivity with some of the milder catalysts and lower carbon numbers, but yields were not good. Ferric chloride, a mild and usually selective catalyst, does not alkylate these olefins except after very extended periods of time and under forcing conditions. The conditions and catalyst required for successful alkylation cause this type of olefin to isomerize into other olefin structures which generally produce secondary alkyl substituted aromatics along with minor amounts of the tertiary types.

Attempts to alkylate aromatic nuclei with $C_7$ and higher tertiary alcohols have been unsuccessful due to a similar isomerization of the tertiary alkyl group during the conduct of the alkylation reaction, again leading to impure mixtures of a predominantly secondary alkyl aromatic hydrocarbon and only small amounts of the tertiary aromatic types. Furthermore, large amounts of catalyst are required. When the more selective catalysts are employed, yields have been found to be low or the reaction did not occur at all.

For the first time, the present inventor has discovered that the key to selective alkylation with high yields lies in (1) using a tertiary alkyl halide and (2) controlling the concentration of hydrogen halide in the reaction liquid. As is understood by those skilled in the art, during the alkylation reaction the halogen from the tertiary alkyl halide reacts with a hydrogen from the aromatic nucleus, producing a hydrogen halide product which goes into solution and saturates the liquid reaction phase. The present inventor has found that, by operating the reaction at a suitably reduced pressure and in the presence of a boiling liquid (which may be the aromatic hydrocarbon itself), the hydrogen halide is stripped from the reaction mass as fast as it is produced, and the isomerization of the tertiary alkyl halide is avoided. The use of a boiling liquid in the reaction zone assists in carrying the evolved hydrogen halide into the vapor phase above the reaction mass, removing it from contact with the tertiary alkyl halide. The use of a vacuum performs two functions: it provides a boiling liquid at the low temperatures at which the alkylation reaction is carried out, and also insures the withdrawal of the hydrogen halide from the vapor phase as rapidly as it is brought out of the liquid reaction mass so that (a) it cannot redissolve to form the said complex which isomerizes the t-alkyl halide and (b) the reaction, which is reversible, goes mostly in the alkylation direction whereby high yields are obtained. With the more active catalysts such as $AlCl_3$, the additional use of an inert purge gas or air to further lower the hydrogen halide concentration is effective in increasing both the yield and the selectivity of the alkylation reaction. See Table II.

The reactions taking place in the liquid reaction mass are believed to be presented on a simplified basis as follows:

Tertiary alkylation

1.

(a) R′CH₂—C(RCH₂)(R″CH₂)—Cl + FeCl₃ ⟶ R′CH₂—C(RCH₂)(R″CH₂)—Cl·FeCl₂

| Tertiary alkyl chloride | Friedel Crafts type catalyst I | Tertiary alkyl complex formed II |

(where R, R′ and R″ are the same or different alkyl groups or hydrogen)

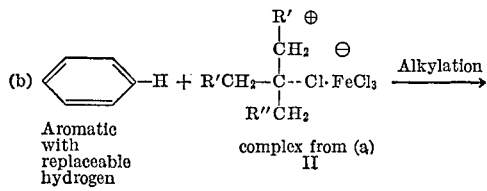

(b) Aromatic with replaceable hydrogen + R′CH₂—C(R′CH₂⁺)(R″CH₂)—Cl·FeCl₂ (complex from (a) II) $\xrightarrow{\text{Alkylation}}$

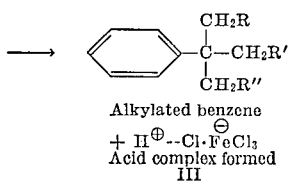

Alkylated benzene + H⁺--Cl·FeCl₃⁻
Acid complex formed
III

Isomerization

2.

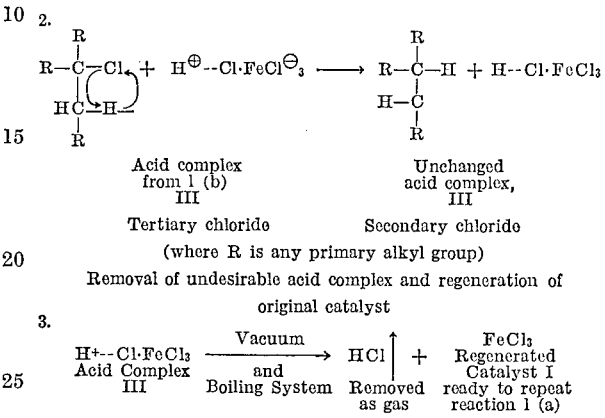

Acid complex from 1 (b) III
Tertiary chloride

Unchanged acid complex, III
Secondary chloride (where R is any primary alkyl group)

Removal of undesirable acid complex and regeneration of original catalyst

3.

H⁺--Cl·FeCl₃  $\xrightarrow[\text{and Boiling System}]{\text{Vacuum}}$  HCl Removed as gas + FeCl₃ Regenerated Catalyst I ready to repeat reaction 1 (a)

Acid Complex III

In reaction 1(a) it is seen that the tertiary chloride forms a tertiary alkyl complex with the Friedel Crafts catalysts (ferric chloride) and in 1(b) this complex alkylates with the aromatic hydrocarbon, producing the desired tertiary alkylated aromatic. However, it is also noted that an undesirable acid complex (III) is produced. This acid complex is an isomerization catalyst, encouraging the isomerization of tertiary alkyl chlorides into secondary chlorides as shown in Reaction 2. According to the present invention, isomerization is greatly minimized and for all practical purposes avoided if the acid catalyst is decomposed as rapidly as it is formed. By conducting the entire set of the reactions in a boiling liquid and under a vacuum so that the hydrogen halide is rapidly removed from the reaction zone as a gas, the isomerization catalyst complex is decomposed (or its formation avoided) so that the competing isomerization reaction can be minimized. It also appears that, by avoiding the formation of the acid complex (or decomposing it rapidly), the alkylation catalyst ($FeCl_3$) is regenerated or maintained in the active state, thereby increasing the speed of the alkylation reaction as well as its selectivity. The removal of the hydrogen halide has the further advantage that it drives the reaction to near completion.

The present invention will be discussed in its various aspects, separately treating with the tertiary alkyl chloride, the aromatic nucleus upon which the alkylating agent will be reacted, the catalyst which is employed, and the reaction conditions.

(1) Tertiary alkyl chloride

The tertiary alkyl chloride may have from 7 to 44 carbon atoms, depending upon the desired product. Where the desired product is to be used as a lubricant, the tertiary alkyl halide may contain from 12 to 44 carbon atoms, and the final product may be either mono- or dialkylated (or a mixture of mono- and dialkylated) benzenes. For monoalkylated benzene, a $C_7$ to $C_{32}$ (e.g., $C_{12}$ to $C_{32}$) tertiary alkyl chloride may be employed.

The tertiary alkyl halide of the present invention will have a structural formula as follows:

$$R-\underset{\underset{X}{|}}{\overset{\overset{R'}{|}}{C}}-R''$$

wherein R, R′ and R″ are any primary alkyl groups (branched or unbranched), X is a halide (preferably a chloride), and the total of all carbon atoms in the tertiary alkyl halide is from 7 to 44. An example of a t-alkyl chloride having a branched substituent is a dimer or trimer of a t-alkyl chloride, which may have a structure as follows:

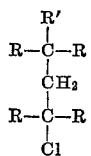

where R represents n-alkyl groups, alike or unlike, and R' is usually a methyl group, As referred to hereinafter, the tertiary alkyl chlorides are identified in abbreviated form by the number of carbon atoms in R, R' and R'', following the form shown below in the exemplary list of suitable tertiary alkyl chlorides.

TABLE I.—EXAMPLES OF SUITABLE ALKYL HALIDES

| Tertiary alkyl chlorides | Carbon atoms present | | | |
|---|---|---|---|---|
| | R [a] | R' [a] | R'' [a] | Total |
| $CH_3-\underset{Cl}{\underset{|}{C}}-CH_2-\underset{CH_3}{\underset{|}{C}}-CH_3$ with $CH_3$ on first C | 1 | 1 | 5 | 8 |
| $CH_3-\underset{Cl}{\underset{|}{C}}(CH_3)-C_9H_{19}$ | 1 | 1 | 9 | 12 |
| $C_2H_5-\underset{Cl}{\underset{|}{C}}(CH_3)-C_3H_7$ | 2 | 1 | 3 | 7 |
| $C_6H_{13}-\underset{Cl}{\underset{|}{C}}(CH_3)-C_{12}H_{25}$ | 6 | 1 | 12 | 20 |
| $C_2H_5-\underset{Cl}{\underset{|}{C}}(C_2H_5)-C_4H_9$ | 2 | 2 | 4 | 9 |
| $C_{20}H_{41}-\underset{Cl}{\underset{|}{C}}(CH_3)-C_{22}H_{45}$ | 20 | 1 | 22 | 44 |
| $C_{10}H_{21}-\underset{Cl}{\underset{|}{C}}(C_{10}H_{21})-C_{10}H_{20}$ | 10 | 10 | 10 | 31 |

[a] Abbreviated identification.

From the above table, it can easily be seen that suitable alkyl tertiary chlorides can contain from 7 to 44 carbon atoms. Other suitable tertiary alkyl halides will be seen in the various examples hereinafter given.

Preferably, the alkyl halide will contain at least one methyl group, and the number of carbon atoms in each of the remaining two alkyl substituents will range from 1 to 22, with the total number of carbon atoms remaining in the range of 12 to 44.

The particular tertiary alkyl chloride will be chosen on the basis of the properties desired in the alkylation product. Thus, where benzene is to be alkylated, and a synthetic lubricant is to be produced, the tertiary alkyl chloride should contain from 12 to 44 carbon atoms. The products are found to have higher flash points when compared to nonaromatic hydrocarbons of equal carbon number, making them easier and safer to use for a variety of needs.

The tertiary alkyl halides are suitably prepared from the corresponding alcohol, by the simple reaction with the hydrogen halide. The tertiary alcohols may be themselves prepared by Grignard coupling of suitable reagents, all as is well known to those skilled in the art.

(2) Aromatic nuclei

The nucleus chosen for the alkylation reaction will contain at least one aromatic ring. Suitable for the alkylation reaction are benzene, mono-t-alkyl benzenes, naphthalene, phenanthrene, anthracene or higher condensed rings, and the lower alkyl derivatives thereof such as toluene, meta-xylene, orthoxylene, ethylbenzene, propylbenzene, isopropylbenzene, methyl naphthalenes, ethyl naphthalenes, dimethyl naphthalenes, methyl anthracenes, ethyl anthracenes, and substituted polyphenyls. Also suitable are diphenyl, diphenyl oxide, polyphenyl oxides, anisole and other phenyl-alkyl ethers. Cycloparaffins may also be present as a condensed portion of the aromatic nucleus (e.g., tetrahydronaphthalene). Substituents other than alkyl groups may be present on the aromatic ring, so long as they are not deactivating to the catalyst employed and do not react with the alkyl chloride. For example, the methyl ether of phenol is suitable for reaction but 1,2-dinitrobenzene does not react. Generally, except where the products are intended for use as chemical intermediates, a benzene or a naphthalene ring will be employed as the nucleus.

In the preparation of heat and oxidation resistant synthetic lubricants, the unsubstituted benzene and naphthalene are employed. However, t-alkyl substituted benzene or naphthalene may be used where a di-t-alkyl synthetic lubricant is to be produced. In no event can substituents other than a t-alkyl group be used if highest oxidation and thermal stability are to be attained.

Since the aromatic nucleus may have a freezing point higher than the optimal temperature conditions employed for the alkylation reaction, it may in some cases be necessary to utilize a solvent for the aromatic hydrocarbon. Further, since the use of naphthalene, for example, would make the aromatic nucleus too heavy for use as the boiling liquid, a solvent may be employed to provide the boiling liquid which is necessary for the stripping of hydrogen halides from the reaction mixture. The solvent (or solvent mixture) is chosen to have a boiling point within the temperature range chosen for the alkylation reaction, under the reduced pressure which is to be employed. An additional advantage for the use of a boiling solvent is the control of the temperature within a narrow range, since the solvent would act as an autorefrigerant. In addition, as hereinabove mentioned, a sweep gas such as air or (preferably) an inert gas such as nitrogen may be employed to improve the stripping of hydrogen halides from the reaction mass.

Benzene, as shown later in the examples, can be employed itself as the boiling liquid. However, if desired, butane or other low-boiling solvent can be employed, particularly if the desired reaction temperature is below the normal freezing point of benzene. The solvent may be used in amounts of from 0 to 40 mols per mol of aromatic hydrocarbon, but generally from 0 to 20 mols per mol will be employed. The solvent will boil from a temperature of about $-15°$ C. to about $+200°$ C. (as measured to 760 mm. Hg. pressure). Preferably, the solvent will boil within the range from $+25°$ C. to $+100°$ C. (as measured at 760 mm. of pressure).

The volume ratio of t-alkyl halide to aromatic hydrocarbon would be chosen, at least in part, with respect to the desired product; that is, whether a mono- or a dialkyl substituted aromatic hydrocarbon is to be obtained. Where a substantially mono-t-alkyl substituted product is desired, the molar ratio of alkyl halide to aromatic hydrocarbon will be within the range from 1/40 to about 5/1, preferably from about 1/40 to about 1/2. Where a di-t-alkyl aromatic product is desired, the molar ratio of alkyl halide to aromatic hydrocarbon would be within the range from about 20/1 to about 1/10, preferably from about 10/1 to about 1/2. An inert solvent is used, when the ratio is 1/1 or higher, so as to assure the presence of a boiling liquid. Where the t-alkyl aromatic hydrocarbon as formed is not removed continuously from the reaction zone and fresh aromatic hydrocarbon added to replace it, inert solvent must be added to provide the boiling liquid medium. If the aromatic hydrocarbon already contains a tertiary substituent, a wider range of ratios will be employed, for example, 30/1 to about 1/20, preferably from about 20/1 to about 1/10. Only a maximum of two tertiary alkyl groups can be attached to a benzene nucleus, hence the ratios are less critical when di-t-alkyl benzene is the desired end product.

(3) Catalysts

Any of the well-known Friedel Crafts alkylation catalysts can be employed in the present invention, and in the manner already employed by those skilled in the art. Because of its selectivity, $FeCl_3$ is the preferred catalyst.

The amount of catalyst to be employed will vary, depending upon the particular catalyst employed and system in which it is to be used, all as is well known to those skilled in the art. Usually, enough catalyst is employed to assure that the reaction medium is saturated with the soluble catalyst and some solid catalyst remains undissolved. From the standpoint of economics, of course, the amount of catalyst employed will be kept at a practical minimum.

The preferred range of catalyst usage will be between 0.005 and 0.1 mol of catalyst per mol of alkyl chloride.

(4) Reaction conditions

The reaction conditions will be chosen to accomplish the desired selective alkylation and will involve a temperature within the range from about $-20°$ C. to about $+100°$ C. (preferably from about $0°$ C. to about $+30°$ C.) and a pressure from about 5 mm. Hg. to about 400 mm. Hg absolute, preferably from about 15 mm. Hg to about 300 mm. Hg absolute. In the most preferred case, the pressure will be maintained below 150 mm. Hg absolute. With $AlCl_3$ catalyst, it is preferred to maintain the pressure below 100 mm. Hg absolute. The reaction time may vary widely, depending upon the method of addition of the reagents as well as upon the reaction temperature. In general, the aromatic hydrocarbon residence time may range from 2 minutes to 8 hours in the reaction zone. In the laboratory, the time has been broken into three phases: (1) from 0.2 to 1.1 hours for alkyl halide addition, (2) from 0.2 to 1.5 additional hours of holding time, and (3) a final stripping stage which consumes an additional 0.2 to 1.0 hour. In pilot plant work, the time periods have been both shorter and longer than the laboratory periods. For example, the alkyl halide has been initially completely charged into the reaction vessel, providing an addition time of 0 hour, and on other occasions has been added over extended periods of time as long as 3.5 hours. The holding time has ranged as long as 40 hours. The stripping stage has been omitted in some cases, providing a stripping time of 0 hour. Generally, a 1-hour stripping stage has been found to be desirable, however.

All of the reaction conditions will be coordinated so as to remove the hydrogen halide evolved from the alkylation reaction at a rate sufficient to maintain the hydrogen halide concentration in the liquid reaction phase at or below the critical level. The critical level varies widely with the systems and compounds being alkylated, and can easily be determined for each system by routine experimentation. The maximum hydrogen halide concentration in the present invention when operating under a vacuum at $-10°$ to $40°$ C., using $FeCl_3$ and similar mild catalysts (with benzene as a nucleus), is less than 0.02 mol fraction of hydrogen halide concentration in the reaction mass. Where it is practical and when employing more active catalysts such as $AlCl_3$, the concentration is maintained much lower, below 0.005 mol fraction. With $AlCl_3$ and similar very active catalysts, with benzene as a nucleus, the preferred level is below 0.001 mol fraction. It should be noted that in some systems the presence of trace amounts of HCl are necessary in order to initiate the reaction. However, once the reaction has been initiated, the present invention allows the removal of the hydrogen chloride substantially as quickly as it is formed, except for the small amounts which remain dissolved in the reaction mass. It is the maintenance of this residual, dissolved HCl at a suitably low level that forms the basis of the present invention.

The hydrogen halide mol fraction can be calculated as follows:

Since the principal volatile components in the reaction are benzene and HCl at equilibrium, the following calculations provide an adequate means of determining the mol fraction of HCl in the liquid reaction phase. When a cosolvent is employed as the boiling liquid, the calculations should be modified to include the other solvent as part of the system.

The total pressure is the sum of the partial pressure of benzene and of HCl:

$P=$(Mol fraction HCl$\times$equilibrium vapor pressure of HCl)$+$(Mol fraction benzene$\times$equilibrium vapor pressure of benzene)

Solubility data show that HCl concentration in benzene is abnormally high by a factor of about 1.7. Therefore, letting $f_{HCl}$ represent the mol fraction of HCl and letting $f_{Bz}$ represent the mol fraction of benzene.

$$P=f_{HCl}\left(\frac{P_{HCl}}{1.7}\right)+f_{Bz}P_{Bz} \qquad (1)$$

Solving for $f_{HCl}$, we obtain:

$$f_{HCl}=\frac{P-f_{Bz}P_{Bz}}{\frac{P_{HCl}}{1.7}}=\frac{1.7(P-f_{Bz}P_{Bz})}{P_{HCl}} \qquad (2)$$

Since $f_{HCl}$ is extremely small, $f_{Bz}$ is almost equal to 1. For simplification, $f_{Bz}$ is assumed to be 1 and the equation becomes:

$$f_{HCl}=\frac{1.7(P-P_{Bz})}{P_{HCl}} \qquad (3)$$

Equation 3 was used in calculating the values plotted in graphic form in the figure.

EXAMPLES

In order to illustrate the process of the present invention, the following examples are given. In these examples, the reaction was carried out in a three-neck, 250 ml. flask, connected to a reflux condenser and bubbler and also to a source of controlled vacuum, with a dropping funnel being provided for the introduction of a liquid feed. The reaction flask was provided with a thermometer, a magnetic stirrer and a cooling bath. In the examples, the Friedel-Crafts catalyst in the aromatic hydrocarbon was charged to the flask, while additional aromatic hydrocarbon (or cosolvent) was introduced along with the tertiary alkyl chloride. The flask contents were chilled to a suitably low temperature, the pressure adjusted at the suitable pressure, and the contents of the dropping funnel added over a relatively long time period (e.g., 20 minutes). The temperature was held within the desired range and the reaction products withdrawn in the vapor phase to the controlled vacuum line. The reaction products (mainly HCl) and volatilized liquid (aromatic hydrocarbon or cosolvent) were removed at a rate sufficient to maintain the hydrogen halide concentration in the liquid phase at the indicated level. A stripping period at even further reduced pressure was employed at the end of the vacuum runs. In some runs, where atmospheric pressure was employed, the vacuum was not drawn and the reflux condenser was allowed to reach equilibrium with the outside air.

After a workup of data, the maximum HCl mol fraction was calculated as well as the conversion and selectivity. The results are shown below in Table II.

TABLE II.—ALKYLATION OF BENZENE WITH TERTIARY ALKYL CHLORIDES

| Ex. No. | Alkyl agent | Catalyst | Press., mm. Hg [1] | Max. HCl, mol. fract. | Reaction time, hrs. [2] | Temp., °C. | Conversion, mol percent [3] | Selectivity, percent | Comments |
|---|---|---|---|---|---|---|---|---|---|
| 1 | 2-2-2, Cl | $FeCl_3$ | 760 | 0.05180 | 0.9 | 10 | 41.9 | >95 | At 0.05180 HCl shows low conversion. |
| 2 | 2-2-2, Cl | $FeCl_3$ | 28 | 0.00142 | 1.7 | 0 | 84.8 | 99+ | At 0.00142 HCl, good. |
| 3 | 2-2-2, Cl | $AlCl_3$ | 760 | 0.01900 | 1.6 | 7-28.5 | 83 | <1 | Shows low selectivity; boiling butane cosolvent. |
| 4 | 2-1-3, Cl | $FeCl_3$ | 300 | 0.01622 | 3.0 | 12-22 | 92.8 | 86-96 | Selectivity range for several cuts. |
| 5 | 2-1-4, Cl | $FeCl_3$ | 300 | 0.01820 | 4.0 | 5-15 | 95.8 | 91 | Shows good yield and selectivity at 0.01820 HCl. |
| 6 | 1-1-7, Cl | $FeCl_3$ | 40 | 0.00300 | 2.3 | 6 | 87 | 99+ | |
| 7 | 1-1-14, Cl | $FeCl_3$ | 60-75 | 0.00287 | 1.9 | 6-20 | 90 | 99+ | |
| 8 | 3-1-12, Cl | $FeCl_3$ | 300 | 0.01625 | 4.0 | 12 | 95 | 80-96 | Selectivity range for several cuts. |
| 9 | 2-1-8, Cl | $FeCl_3$ | 40 | 0.00273 | 2.3 | 6-10 | 80.5 | 98-99+ | Do. |
| 10 | 1-1-14, Cl | $AlCl_3$ | 50-60 | 0.00450 | 1.3 | 6-10 | 87.3 | 86 | Cf Ex. 3; note selectivity. |
| 11 | 9-1-10, Cl | $(AlCl_3).2(FeCl_3)$ | 39 | 0.00221 | 0.5 | 14-18 | 96 | 100 | |
| 12 | 9-1-10, Cl | $(AlCl_3).3(FeCl_3)$ | 62-95 | 0.00455 | 0.8 | 10-25 | 97 | 66.4 | Higher HCl conc. with $AlCl_3$ reduces selectivity. |

[1] Usually finished at lower pressures.
[2] In stages (a) time of addition (0.5 to 1 hr.), (b) holding (1 hr.), (c) finishing (0.5 hr.).
[3] Based on t-alkyl chloride content.

Referring now to Table II, it is seen that Example 1 illustrates the alkylation of benzene, using ferric chloride as a catalyst at atmospheric pressure. The maximum HCl mol fraction is 0.05180. The results show a high selectivity, but a conversion of only 41.9 mol percent. Note that reducing the mol fraction of HCl to 0.00142 in Example 2 raised the conversion to 84.8 mol percent and the selectivity to 99+%. Example 4 illustrates the use of 300 mm. of pressure which allows the HCl mol fraction to increase to 0.01622, which provided a 92.8% conversion with a selectivity range for several cuts of 86 to 96%. Note that Example 6, at 40 mm. Hg pressure, the maximum HCl mol fraction was 0.00300 and an 87 percent conversion at 99+% selectivity was obtained.

In Example 7, the $C_{17}$ chloride was used at 60 to 75 mm. Hg pressure, at a maximum HCl mol fraction of 0.00287 to provide a 90% conversion at 99+% activity. Thus it is shown that, even though the tendency to isomerize increases with the number of carbon atoms, the present invention allows the carrying out of the alkylation reaction with good yields and high selectivities, even when using tertiary alkyl chlorides of high chain length.

Referring now to Example 3, it is seen that aluminum chloride, being a much more active catalyst, forms 83% product but with less than 1% selectivity to the tertiary alkyl chloride when the reaction is carried out at atmospheric pressure and an HCl mol fraction of 0.1900. These results should be compared with Example 10 where the run was made at 50-60 mm. Hg with a maximum HCl mol fraction of 0.00450 wherein 87.3% conversion was obtained at 86% selectivity even though a $C_{17}$ chloride was used as the alkylating agent, and to Example 5 wherein essentially the same mol fraction of HCl was not injurious to the reaction when $FeCl_3$ was used as a catalyst and a vacuum was employed.

Examples 11 and 12 are included to show that the $C_{21}$ tertiary chloride can be used, even with a combination catalyst system, to obtain good yields with acceptable selectivity. Note that at a maximum HCl mol fraction of 0.00221, a 100% selectivity was obtained, although the conversion was only 50 mol percent. Where the mol fraction was allowed to increase to 0.00455, a 97% conversion was obtained with a concomitant loss of selectivity to the (still acceptable for such long chain lengths) level of 66.4, which is outstanding for a tertiary alkyl chloride having 21 carbon atoms.

Thus it is seen that the present invention allows selective tertiary alkylation to be carried out with $C_7+$ alkyl chlorides, obtaining high conversions with good selectivity.

In order to illustrate with more specificity the manner in which the examples were carried out, following are descriptions of the procedure used in several of the runs which are tabulated in Table I.

Example 3.—Alkylation of benzene with 3-chloro-3-ethylpentane (2-2-2). This example shows that the use of atmospheric pressure is unsuitable, leading to the formation of nontertiary alkyl product, even when using a $C_7$ t-alkyl chloride.

A 5-liter flask in a water bath was used for this example, and it was equipped with four outlets for a calibrated dropping funnel, a thermometer, an inlet for liquid butane, a vent tube, and a magnetic stirrer.

The pot was charged with 585 g. of prechilled dry benzene, 13 g. of anhydrous $AlCl_3$ and 598 g. of butane. The dropping funnel was charged with 135 g. of 3-chloro-3-ethylpentane and 585 g. of dry benzene. The contents of the dropping funnel were added over a period of 1.6 hours and the temperature in the flask allowed to rise from an initial 7° C. to about 28.5° C. The pressure was 760 mm. Hg. After completion of the reaction, the product was water washed and the butane and benzene stripped from the reaction product. Gas chromatographic and NMR analyses were then carried out to determine that the yield was 83% of alkylate but that over 99% of the product was nontertiary in structure.

Example 7.—Alkylation of benzene with 2-chloro-2-methylhexadecane (1-1-14) using ferric chloride as a catalyst. The flask was charged with 1.6 g. of ferric chloride (anhydrous) and 24 g. of dry benzene. The dropping funnel was charged with 24 g. of dry benzene and 28 g. of the (1-1-14) chloride. The flask contents were chilled to about 5° C., pressure adjusted at 60-75 mm. Hg and the contents of the dropping funnel added over a period of 20 minutes. The temperature was held at 3-7° C. and the reaction proceeded very rapidly as shown by vigorous boiling and the evolution of HCl gas through the bubbler. After the chloride was added, 5 g. of additional benzene were added and conditions maintained for a further 40 minutes. After this time, the pressure was reduced to about 20-30 mm. Hg and held for 15 minutes to strip the reaction liquid phase of remaining volatile components. The contents then were poured over an ice-salt mixture to terminate the reaction. After working up the product by three (aqueous) saturated NaCl washes (100 ml. each) and filtering, the benzene was removed on a rotating evaporator. The yield of stripped product was 29.4 g. Examination of a sample of the stripped product by nuclear magnetic resonance (NMR) showed nearly complete tertiary alkylation with no measurable hydrogen atoms alpha to the ring. The calculated maximum HCl concentration during the reaction was 0.00287 mol fraction (mol HCl per mol of solution). This was calculated on the Antoine equations for HCl and benzene, corrected for the solubility of HCl in benzene. At atmospheric pressure and the same temperature, the calculated HCl concentration would have been 0.0529 mol fraction.

Example 10.—Alkylation of benzene with 2-chloro-2-methylhexadecane (1-1-14) using $AlCl_3$ as a catalyst. The flask was charged with 24 g. of dry benzene and 1.3 g. of anhydrous aluminum chloride. The dropping funnel was charged with 24 g. of dry benzene and 28 g. of (1-1-14) chloride. The flask contents were chilled to 6-10° C., the pressure adjusted to 50-60 mm. Hg absolute, and the contents of the dropping funnel added over a period of 21 minutes. The reaction was held an additional 55 minutes at a pressure of 50–60 mm. Then full house vacuum (20–30 mm.) was applied and held for an additional 15 minutes. The product was worked up as in Example 7 and 26.1 g. of yield were obtained. The maximum HCl concentration during the reaction was calculated at 0.00450 mol fraction. Under the same conditions at 760 mm., the concentration would have been 0.0488 mol fraction.

The product was examined by NMR and found to contain only 16% nontertiary alkylbenzenes and 84% desired tertiary alkylbenzene.

Example 10 illustrates that aluminum chloride can be used as catalyst, and only a small amount of undesirable isomerization occurs.

Other examples.—Following are other examples showing different aspects of the present invention.

Example 13.—This example shows that with $FeCl_3$ catalyst benzene cannot be successfully alkylated with the $C_{17}$ (1–1–14) olefin rather than the (1–1–14) chloride. The flask was charged with 24 g. of dry benzene and 1.6 g. of $FeCl_3$ (anhydrous). The dropping funnel was charged with 24 g. of benzene and 24 g. of the (1–1–14) branched olefin. The flask and its contents were held with stirring at atmospheric pressure and 10° C. while the benzene/olefin mixture in the dropping funnel was added over a period of 20 minutes. The ice bath was removed and the flask warmed to room temperature (25° C.) for an additional hour. One milliliter samples were taken at 15, 30 and 45 minutes intervals after the start and at the end of the reaction. After 1 hour and 20 minutes, the reaction mixture was poured over an ice-salt mixture, separated and washed three times with 100 ml. of a saturated NaCl aqueous solution. It was paper filtered and benzene removed on the rotating evaporator. A yield of 21.6 g. was obtained, but gas chromatograph data showed no alkylation product in any of the samples.

Example 13 illustrates that tertiary alkylation with the olefin cannot be carried out directly, but that the use of the alkyl halide is necessary.

Example 14.—This example shows the alkylation of benzene with two tertiary alkyl groups. The procedure of Example 14 was carried out in two steps and in equipment which was larger than that referred to in the general discussion of examples. In Step 1, 1560 g. of dry benzene and 24.3 g. of $FeCl_3$ (anhydrous) were charged to the flask while 1560 g. of dry benzene and 342 g. of 2-chloro-2-methylbutane (1–1–2) were charged to the dropping funnel. The contents of the funnel were added over a 2-hour period, while the flask was maintained at 7–8° C. and 400 mm. pressure. Thereafter, the contents were held at 1.5 hours at the same temperature and pressure. After 3.5 hours, the pressure was reduced to 100 mm. Hg and held for 15 minutes. The reaction was terminated by pouring the mixture over an ice-salt mixture and worked up as previously described. The product was distilled to recover the tertiary amylbenzene overhead (yield 387 g.) and this was used as the charge for the second step. Under the conditions employed, the maximum HCl concentration was about 0.02577 mol fraction as compared to 0.0515 mol fraction which would have been present at 760 mm. About 90% of the feed chloride was converted to give a mixture of about 2.6 mols of crude monotertiary amylbenzene and 0.14 mol of crude ditertiary amylbenzene.

119 g. of the tertiary amylbenzene from Step 1 and 5.7 g. of $FeCl_3$ (anhydrous) were charged to the flask. The dropping funnel was charged with 176 g. of 2-chloro-2-methyltetradecane (1–1–12). The alkyl chloride was added over a period of 1 hour to the flask which was maintained under a temperature of 0° to 5° C. and a pressure of 40 mm. Hg absolute. It was held for an additional hour under those conditions and the temperature then raised to 20° C. for 15 minutes and the pressure thereafter reduced to 15 mm. Hg for an additional 20 minutes. The product was worked up and examined to determine the nature of the product. Only about 15% of the product contained a hydrogen atom alpha to the ring.

Although some isomerization did take place with the heavier fractions, the alkyl attachments remained predominantly tertiary. This is true even in the bottoms fraction recovered from Step 1 where the maximum nontertiary attachment was seen to be 15% by NMR examination. The calculated maximum HCl concentration in the second step was 0.00349 mol fraction as compared to 0.0585 for the same alkylation if conducted at 760 mm. Hg pressure.

This example shows the effectiveness of the present invention in adding a tertiary alkyl group to a benzene ring which already contains a tertiary alkyl substituent.

Example 15.—Alkylation of naphthalene with 3-chloro-3-ethylpentane (2–2–2) using cyclohexane solvent. The flask was charged with 100 g. of cyclohexane solvent, 25.6 mols of naphthalene, and 1.6 g. of $FeCl_3$ (anhydrous). The dropping funnel was charged with 13.5 g. of the (2–2–2) chloride. The addition was carried out over a period of 0.3 hour, and to the flask which was maintained at 20° C. and 65 mm. Hg. The reaction was held for an additional 3 hours under the same conditions, and then for a half hour at 20–30 mm. Hg. The product was worked up and found to contain no measurable benzilic hydrogen (a hydrogen atom alpha to the aromatic ring). Thus, by reducing the pressure and using cyclohexane as a boiling liquid, selective alkylation was accomplished.

Example 16.—Alkylation of alpha methyl naphthalene with 3-chloro-3-ethylpentane (2–2–2) using cyclohexane solvent. A run similar to Example 6 was made using 40 g. of cyclohexane, 28.4 g. of alpha methyl naphthalene and 1.6 g. of $FeCl_3$ (anhydrous) in the flask, with 13.5 g. of 3-chloro-3-ethylpentane (2–2–2–) in the dropping funnel. The addition was carried out over 0.13 hour, the flask being maintained at 22° C. and 65 mm. Hg. The reaction was held under those conditions for an additional 3 hours and then for 0.5 hour at 20–30 mm. Hg. After a workup of the product, the NMR analysis showed 65.2% alkylation based on the tertiary chloride. Ninety percent of the product was 3-ethyl-3-naphthylpentane and nearly 10% 3-methyl-3-naphthylpentane with possible traces of 2-methyl-2-naphthylpentane. It is to be noted that although the tertiary alkyl group isomerized, the product was still a tertiary alkyl. No measurable quantity of benzilic hydrogen was found in the alkylated product. The maximum HCl concentration during alkylation was calculated to be 0.0034 mol fraction. This example shows that $\alpha$-methyl naphthalene, as well as naphthalene, can be selectively alkylated with the present process.

Example 17.—Alkylation of t-butylbenzene with 3-chloro-3-methylpentadecane (2–1–12) in the presence of triethylamine. The flask was charged with 114 g. of t-butylbenzene, 24.3 g. of anhydrous iron chloride, and 8.6 g. of triethylamine. The dropping funnel was charged with 14 g. of t-butylbenzene and 221 g. of 3-chloro-3-methylpentadecane (2–1–12). The addition was carried out for a total of 1.5 hours, while the flask was maintained at a temperature of 12–36° C. and 40 mm. Hg. The reaction was held under those conditions for an additional hour and then the pressure was reduced to about 15 mm. Hg and held for about 0.5 hour. The product was worked up and found to represent a 24% molar yield based on the tertiary chloride. Only traces of benzilic hydrogen were discovered by NMR analysis, indicating that tertiary alkylation without isomerization to nontertiary forms had been obtained. It was noted that considerable interchange of alkyl groups had taken place, the highest boiling fractions containing large amounts of di(3-methylpentadecyl)benzene. This example shows that, even where isomerization occurs, the product is still a tertiary alkyl aromatic hydrocarbon.

Example 18.—Alkylation of biphenyl with 3-chloro-3-ethylpentane (2–2–2) using cyclohexane solvent. The flask was charged with 50 g. of cyclohexane, 31 g. of biphenyl, and 1.6 g. of anhydrous iron chloride. The dropping funnel was charged with 13.5 g. of 3-chloro-3-ethylpentane. The addition was carried out over 15 minutes, into a flask maintained at 23° C. and 65 mm. Hg. The reaction mass was maintained under those conditions for an additional three hours after which the pressure was reduced to about 20-30 mm. and held for an additional 0.5 hour. The product was worked up and found to contain both a mono- and dialkylated product, 71% being the 3-1-2 isomer and 29% being the 2-2-2 isomer. It is noted that although isomerization took place, the final product was still tertiary in nature.

Example 19.—Alkylation of anisole with 3-chloro-3-ethylpentane (2-2-2). The flask was charged with 50 g. of dry cyclohexane and 0.16 g. of anhydrous ferric chloride. The dropping funnel was charged with 25 g. of cyclohexane and 32.4 g. of anisole. A second dropping funnel was charged with 25 g. of cyclohexane and 13.5 g. of 3-chloro-3-ethylpentane. The pot and its contents were chilled to 6° C. and the contents of the first dropping funnel were added. The pressure was reduced to 60 mm. Hg and the contents of the second dropping funnel added over 0.3 hour. The temperature was raised to 20° C. and pressure dropped to 40 mm. Conditions were held for one hour while strong evolution of HCl occurred. A vacuum of 20 mm. was pulled for the final half hour and the reaction terminated. After a product workup, it was found that a yield of 63% of alkylated anisole was obtained, with a heart cut alkylate boiling at about 544° F. (converted to 760 mm. Hg) which was about 87% of the total alkylate product. A gas chromatograph analysis showed that the heart cut was a mixture of isomers, all of which were tertiary in nature and with no benzilic hydrogens being present.

Example 20.—Alkylation of diphenyl ether with 7-chloro-7-methylnonadecane (6-1-12). A reaction mixture of 50 g. of dry cyclohexane, 187 g. of diphenylether and 1.5 g. of anhydrous aluminum chloride were charged to the flask. The dropping funnel was charged with 57 g. of 7-chloro-7-methylnonadecane. The addition was carried out over 0.3 hour, while the flask was maintained at 25° C. and 110 mm. Hg. The pressure was gradually lowered to 60 mm. of Hg during the addition. After the addition was complete, the mixture was held for an additional hour at 25° C. and 60 mm. Hg. Thereafter the pressure was reduced to 20-30 mm. and held for an additional 0.5 hour. The product was worked up and found to contain about an 83% yield of product, with the heart cut of the product being a mixture of about 75% of isomers corresponding to Formula I and 25% of isomers, corresponding to Formula II.

(I)

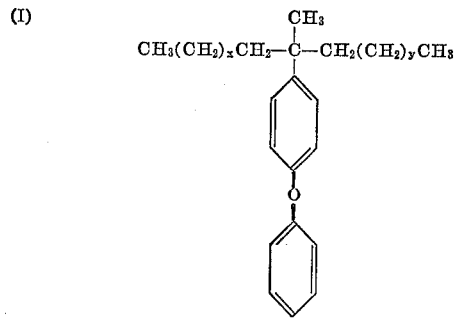

where $x$ and $y$ are whole numbers and $x+y=14$.

(II)

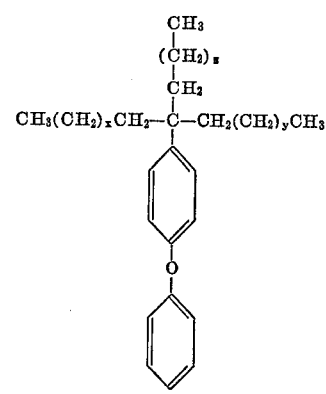

where $x$, $y$ and $z$ are whole numbers or zero and $x+y+z=13$. The calculated hydrogen chloride concentration maximum during the reaction was from 0.0088 to 0.00226.

Thus, it is seen that diphenyl ether can be alkylated with tertiary alkyl substituents by employing the present invention.

Having disclosed the present invention, together with specific examples thereof including a preferred mode, what is desired to be covered by Letters Patent is set forth in the appended claims.

I claim:
1. A process for selectively producing tertiary alkylated aromatic hydrocarbons which comprises:
   in a reaction zone in the liquid phase, reacting an aromatic hydrocarbon with a $C_7$ to $C_{44}$ tertiary alkyl halide while in contact with a finely divided $FeCl_3$ catalyst in a boiling liquid,
   at a temperature within the range from about $-20°$ C. to about $10°$ C. and a pressure from about 5 mm. Hg absolute to about 400 mm. Hg absolute, and a residence time from about 2 minutes to about 8 hours, under conditions correlated to maintain the resulting hydrogen halide concentration in the liquid reaction phase below 0.02 mol fraction,
   while continuously withdrawing gaseous and vaporous products from said reaction zone.

2. A process in accordance with claim 1 wherein the tertiary alkyl halide contains from about 12 to about 44 carbon atoms.

3. A process for selectively producing tertiary alkylated aromatic hydrocarbons which comprises:
   in a reaction zone, in the liquid phase, reacting an aromatic hydrocarbon with a $C_7$ to $C_{44}$ tertiary alkyl halide while in contact with a finely divided $AlCl_3$ catalyst and a boiling liquid,
   at a temperature within the range from about $-20°$ C. to about $100°$ C. and a pressure from about 5 mm. Hg absolute to about 100 mm. Hg absolute, and a residence time from about 2 minutes to about 8 hours, under conditions which are correlated to maintain the hydrogen halide concentration in the reaction liquid below 0.005 mol fraction,
   while continuously withdrawing gaseous and vaporous products from said reaction zone.

4. A process in accordance with claim 3 wherein the tertiary alkyl halide contains from 12 to 44 carbon atoms.

5. A process for selectively producing tertiary alkylated aromatic compound which comprises:
   in a reaction zone, in the liquid phase, reacting an aromatic compound with a $C_7$ to $C_{44}$ tertiary alkyl halide while in contact with a finely divided Friedel-Crafts catalyst and a boiling liquid,
   at a temperature within the range from about $-20°$ C. to about $10°$ C. and a pressure from about 5 mm. Hg absolute to 400 mm. Hg absolute, and a residence time from about 2 minutes to about 8 hours, such condition being correlated to maintain the hydrogen halide concentration in the reaction liquid below 0.005 mol fraction,
while continuously withdrawing gaseous and vaporous products from said reaction zone.

6. A process in accordance with claim 5 wherein the tertiary alkyl halide/aromatic compound mol ratio is within the range of about 20/1 to about 1/40.

7. A process in accordance with claim 6 wherein the aromatic compound is chosen from the group consisting of mono-t-alkyl benzenes, benzene, toluene, ethylbenzene, propylbenzene, isopropylbenzene, ortho- or metaxylene, naphthalene, methyl naphthalenes, ethyl naphthalenes, dimethyl naphthalenes, anthracenes, methyl anthracenes, ethyl anthracenes, phenanthrene, diphenyl, diphenyl oxide and polyphenyl oxides, anisole and other phenyl-alkyl ethers.

8. A process in accordance with claim 7 wherein the catalyst is ferric chloride.

9. A process in accordance with claim 8 wherein the aromatic hydrocarbon is benzene.

10. A process for selectively producing tertiary alkylated aromatic hydrocarbons which comprises:
in a reaction zone in the liquid phase reacting an aromatic hydrocarbon chosen from the group consisting of benzene and naphthalene with a $C_{12}$ to $C_{32}$ tertiary alkyl chloride while in contact with a finely divided Friedel-Crafts catalyst chosen from the group consisting of aluminum chloride, aluminum chloride-nitroparaffin complex, and ferric chloride or admixtures of two of these, and in contact with a boiling liquid,
at a temperature within the range from about $-20°$ C. to about $100°$ C. and a pressure from about 5 mm. Hg to about 150 mm. Hg absolute, and a residence time from about 5 minutes to about 8 hours,
while continuously withdrawing gaseous and vaporous products from said reaction zone,
the temperature, pressure, and rate of removal of gaseous and vaporous products being correlated to maintain the mol fraction of hydrogen halide in the liquid reaction mass at a level below that at which substantial isomerization of the t-alkyl chloride occurs, whereby the production of secondary alkylated aromatic hydrocarbons is minimized.

11. A process in accordance with claim 10 wherein the tertiary alkyl chloride/aromatic hydrocarbon ratio is within the range from about 20/1 to about 1/40.

12. A process in accordance with claim 11 wherein the catalyst is ferric chloride and the HCl mol fraction is less than 0.02.

13. A process in accordance with claim 12 wherein the tertiary alkyl halide corresponds to the structure

wherein R, R′ and R″ are any primary alkyl groups, alike or unlike.

14. A process in accordance with claim 13 wherein R′ is a methyl group and X is chlorine.

15. A process in accordance with claim 14 wherein the aromatic hydrocarbon is benzene.

16. A process in accordance with claim 14 wherein the aromatic hydrocarbon is naphthalene, and the boiling liquid is an inert solvent.

17. A process in accordance with claim 15 wherein R contains from 1 to 3 carbon atoms and R″ contains from 4 to 14 carbon atoms.

18. A process in accordance with claim 17 wherein, after said residence time, the pressure is reduced to a pressure within the range from about 5 mm. to about 50 mm. Hg absolute for a period of about 10 minutes to about 60 minutes before terminating the reaction.

19. A process for selectively producing tertiary alkylated aromatic hydrocarbons which comprises:
in a reaction zone, in the liquid phase, reacting benzene or a lower alkyl derivative thereof or naphthalene with a $C_7$ to $C_{32}$ tertiary alkyl chloride while in contact with a finely divided Friedel-Crafts catalyst,
at a temperature within the range from about $0°$ C. to about $30°$ C. and a pressure from about 5 mm. Hg to about 150 mm. Hg absolute and a residence time from about 5 minutes to about 8 hours,
and in the presence of from 0 to about 0.8 mol fraction of an inert solvent,
while continuously withdrawing gaseous and vaporous products from said reaction zone at a rate to maintain the concentration of hydrogen chloride in the liquid reaction mass below a mol fraction of about 0.0025, and wherein the temperature and pressure are chosen to maintain said aromatic or said solvent at the boiling point.

20. A process in accordance with claim 19 wherein the tertiary alkyl chloride/aromatic hydrocarbon ratio is within the range from about 20/1 to about 1/40.

21. A process in accordance with claim 20 wherein the tertiary alkyl chloride corresponds to the structure

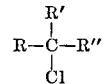

wherein R, R′ and R″ are primary alkyl groups.

22. A process in accordance with claim 21 wherein R′ is a methyl group.

23. A process in accordance with claim 22 wherein R contains from 1 to 4 carbon atoms and R″ contains from 4 to 12 carbon atoms.

24. A process in accordance with claim 23 wherein the aromatic hydrocarbon is chosen from the group consisting of benzene and naphthalene, and the lower alkyl derivatives thereof, and the catalyst is ferric chloride.

References Cited
UNITED STATES PATENTS

| | | | |
|---|---|---|---|
| 2,673,224 | 3/1954 | Kennedy et al. | 260—671 B |
| 2,796,429 | 6/1957 | Kreps et al. | 260—671 B |
| 2,810,769 | 10/1957 | Sanford et al. | 260—671 B |
| 3,115,530 | 12/1963 | Cohen | 260—671 B |
| 3,234,297 | 2/1966 | Cohen | 260—671 B |
| 3,238,249 | 3/1966 | Mirviss et al. | 260—671 B |

CURTIS R. DAVIS, Primary Examiner

U.S. Cl. X.R.

260—671 B, 671 G